Jan. 3, 1956 M. M. VIDES 2,729,454
SIMULTANEOUS SOUND AND MOTION PICTURE SYSTEM
Filed Dec. 7, 1953 2 Sheets-Sheet 1
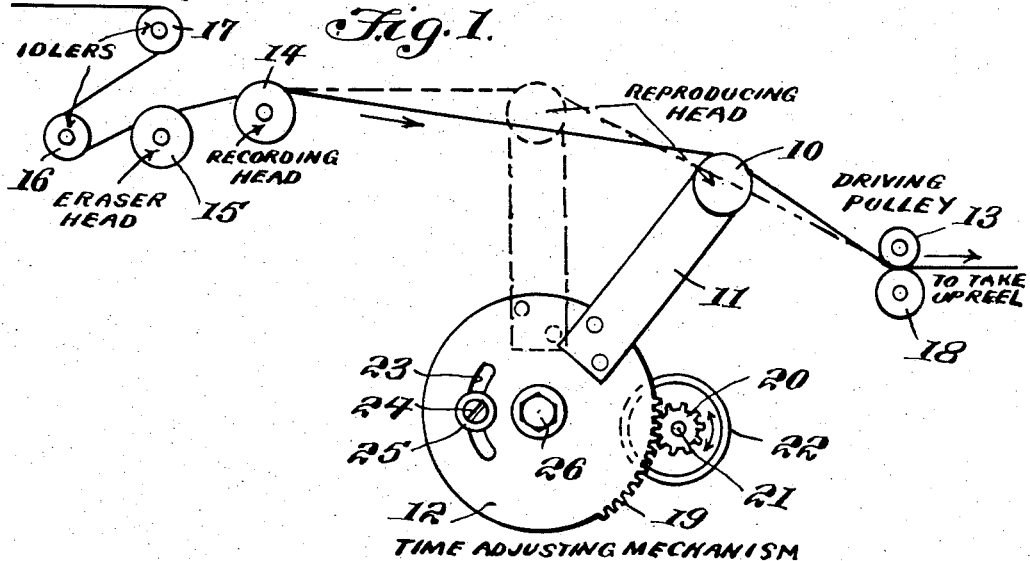
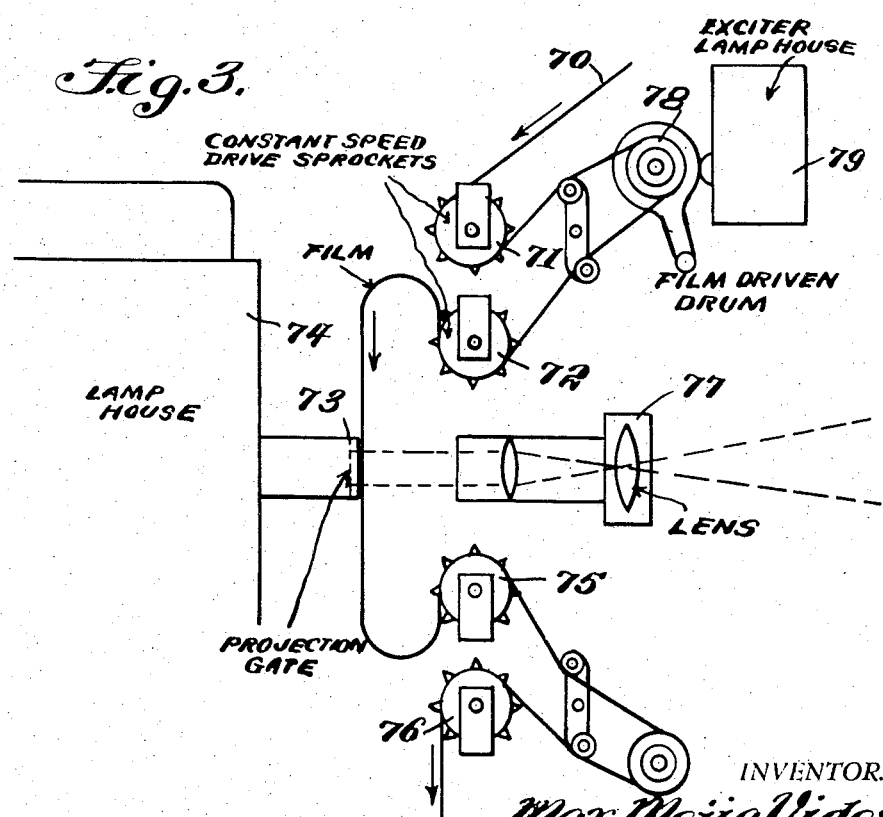
INVENTOR.
Max Mejia Vides,
BY Victor J. Evans & Co.
ATTORNEYS

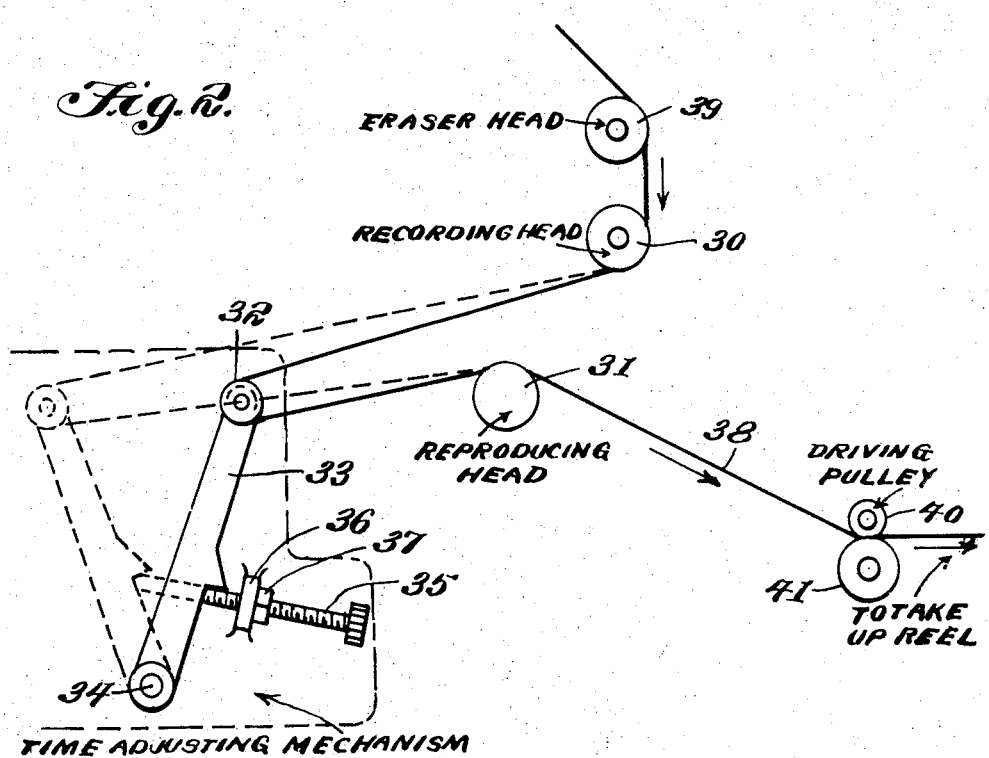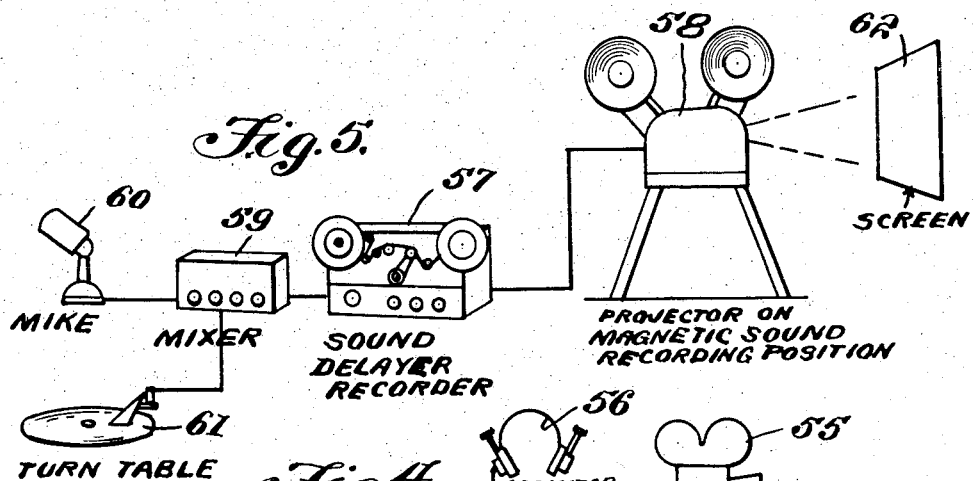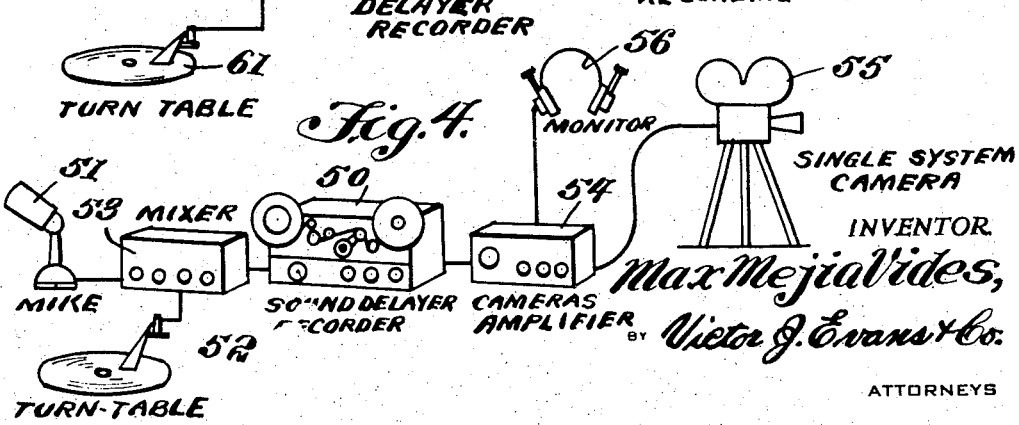

2,729,454

SIMULTANEOUS SOUND AND MOTION PICTURE SYSTEM

Max Mejia Vides, El Salvador, San Salvador

Application December 7, 1953, Serial No. 396,627

1 Claim. (Cl. 274—4)

This invention relates to sound motion picture film and projection thereof, and in particular motion picture film wherein the section of a film on which each picture or frame is positioned carries its own sound track and wherein a picture and sound relating to the picture are projected simultaneously.

The purpose of this invention is to obtain perfect synchronization of sound track and picture images.

In conventional motion picture projection the light gate or lens through which the picture is projected is positioned at one point and the pick-up which takes the sound from the sound track is located at another point and the time interval between the points is between one-half to one and one-half seconds. With this arrangement the sound track for one picture or frame is located at a point spaced ahead or to the rear of the frame and, consequently, the sound track or tracks at the side of sides of a picture frame produces sound to correspond with a picture frame remotely situated from the frame. For this reason it is difficult to cut bad parts from sound moving picture film, edit the associated parts and splice the remaining portions of the film.

The object of this invention is, therefore, to provide means for obtaining simultaneous optic or magnetic recording of a sound track on motion picture frames whereby the section of the film on which each frame is positioned carries the portion of the sound track relating to the picture of the frame.

Another object of the invention is to simplify editing and assembling of sound motion pictures on films.

Another object of the invention is to provide a simultaneous track and picture system for moving picture film which obtains a substantial saving of time in editing and arranging the film and also saves labor and expense in editing and assembling moving picture film.

A further object of the invention is to provide means for incorporating a time delay mechanism in apparatus for editing and assembling a moving picture film wherein pictures and portions of sound track relating to the pictures are positioned for simultaneous reproduction.

A further object of the invention is to provide apparatus for producing motion picture film with the sound track relating to the picture of a frame carried by or positioned to correspond with the frame in which the device is of a simple and economical construction.

With these and other objects and advantages in view the invention embodies a motion picture film assembly system having a reproducing head mounted to coact with a time delaying mechanism and positioned between a camera or projector and a recording head with the recording head positioned to follow an eraser head.

Other features and advantages of the invention will appear from the following description taken in connection with the drawings, wherein:

Figure 1 is a diagrammatic view showing a reproducing head mounted on time delaying mechanism with film, tape, or wire passing over the reproducing head extended from eraser and recording heads and extended to driving pulleys for carrying the film, wire or tape to the take-up reel.

Figure 2 is a diagrammatic view similar to that shown in Fig. 1 in which the film, wire or tape length adjusting means is provided in the form of an arm adjustably mounted between a recording head and a reproducing head.

Figure 3 is a diagrammatic view showing a film trained through a projector having a constant speed drive sprocket with a film driven drum and with oscillatory stabilizer idlers to be operated in combination with the sound delayer for viewing of simultaneous sound track and picture film of this invention.

Figure 4 is a diagrammatic view illustrating the position of the sound delayer recorder of this invention in a single system camera arrangement.

Figure 5 is a similar view showing a sound delayer recorder incorporated in a projector and in which the projector is positioned on the magnetic sound recording position.

Even a layman with little knowledge of single system and double system motion picture film problems will understand the possibilities of a system in which sound tracks of a frame are carried on the section of a film on which the frame is positioned for motion picture and television projections or transmissions. After such films are edited and assembled reproductions may be made with the sound track advanced so that the film may be used with conventional projectors.

An amateur who ordinarily views his originals may edit with professional accuracy and project the improved film with projection apparatus as illustrated in Fig. 3, used in connection with the sound delayer of this invention. It is only necessary for the amateur to cut the bad parts of the film, edit, and splice the film and the film is ready to be projected.

Referring now to the drawings, and particularly Fig. 1 a magnetic sound reproducing head 10 carried by an arm 11 extended from a disc 12 is positioned between a driving pulley 13 and a magnetic sound recording head 14 and from the recording head the magnetic film tape or wire passes through an eraser head 15 and over idlers 16 and 17. The driving pulley 13 coacts with an idler pulley 18 whereby the tape, wire, or film is adapted to be fed to the take-up reel.

As illustrated in Fig. 1 the position of the reproducing head 10 is adjustable to change the length of the film wire or tape from the recording head to the reproducing head. To adjust the position of the reproducing head, the disc 12 is provided with a gear segment 19 that meshes with a pinion 20 on a shaft 21 and the shaft 21 is provided with a hand wheel 22 by which the pinion 20 may be rotated to turn the disc 12 to adjust the position of the reproducing head 10.

The disc 12 is provided with an elongated slot 23 and the disc is retained in adjusted positions with a clamping screw 24 extended through the slot and provided with a washer 25. The disc 12 is journaled on a pin 26. By this means the length of the sound track on a film wire or tape between the magnetic heads 14 and 10 is adjustable to compensate for distance between a picture or frame on a film and a section of a film on which the sound track of said picture or frame is carried.

By accurately adjusting the position of the reproducing head 10 each picture image or frame may be made to register with its corresponding portion of the sound track, leaving sufficient room or margin for splicing without affecting critical or valuable sound or notes.

For post recording where a magnetic recording on film projector is required, as illustrated in Figure 5, images are viewed on the screen as sound is introduced through the sound delayer into the projector recording amplifier and with the time that the sound has been delayed corresponding with that required by the film to travel from the projection gate to the magnetic recording head sound will be recorded on the side of the section of the film corresponding with the picture or frame.

In the design illustrated in Figure 2, instead of moving the reproducing head, a length of film, tape or wire between a recording head 30 and a reproducing head 31 is trained over a pulley 32 on an arm 33 which is pivotally mounted on a pin 34 and with the position of the arm and pulley adjusted by a screw 35 threaded in a projection 36 and secured by a lock nut 37 the position of the pulley 32 may be set whereby the length of the film wire or tape between the heads 30 and 31 can be adjusted. Thus the delaying time is controlled.

As illustrated in Fig. 2 film, wire, or tape 38 travels from an erasing head 39 over the recording head 30, around the pulley 32, through the reproducing head 31 and to the driving pulley 40 from which it passes to a take-up reel. The pulley 40 is positioned to coact with an idler 41, as shown.

It will be understood that the time adjusting mechanism may be incorporated in a camera or projector for use in motion picture editing and assembling apparatus as may be desired.

As illustrated in Fig. 4 a sound delaying recorder, as indicated by the numeral 50 is positioned in a system having a microphone 51, a record or turntable 52 which, with the microphone is fed to a mixer 53 that is connected to a camera amplifier 54 through the sound delayer 50. The camera amplifier may also be provided with a monitor 56, as shown.

In the system illustrated in Figure 5 the sound delaying mechanism or recorder, as indicated by the numeral 57 is positioned before a projector 58 and the sound delayer recorder is connected to a mixer 59 which is connected to a microphone 60 and a turntable or sound reproducer 61. The projector is positioned to project a picture from the film on a screen, as indicated by the numeral 62, whereby dubbing or post recording is accomplished.

In the systems illustrated in Figs. 4 and 5 the projector or camera is positioned on the sound recording position whereby the picture and sound corresponding with the picture frame are reproduced simultaneously.

With the improved simultaneous sound track and picture system of this invention 35 mm., 16 mm., and any other dimension sound motion picture film may carry, on the side or sides of the section of the film on which the picture or frame is positioned a single or multiple sound track, either optic or magnetic, simultaneous with the picture images and where each picture image or frame is in registering relation with its own portion of sound track.

It will be understood that the sound delayer of this invention is adapted to be used in combination with various types of cameras and projectors, however for the purpose of viewing, editing and assembling of the film of this invention a projector arrangement to be used in combination with the sound delayer of this invention is shown diagrammatically in Fig. 3, in which the film 70 is trained, or threaded over constant speed drive sprockets 71 and 72 and film driven drum 78 and stabilizer idlers so arranged as to provide means of reproducing, through the sound delayer of this invention, the optic or magnetic sound tracks of a film of this invention before its projection through gate 73 on a screen takes place.

It will be understood that other modifications, within the scope of the appended claim, may be made in the design and arrangement of the parts without departing from the spirit of the invention.

What is claimed is:

In a device of the character described, a disc, an arm extended from said disc and secured thereto, a magnetic sound reproducing head carried by said arm, a driving pulley and a magnetic sound recording head arranged on opposite sides of said sound reproducing head, a magnetic sound tape having an eraser head and idlers arranged in engagement therewith, said disc being provided with a gear segment, a shaft having a pinion meshing with said gear segment, a hand wheel connected to said shaft, there being an elongated slot in said disc, a clamping screw extended through said slot, a pin having said disc journalled thereon whereby the position of the reproducing head may be adjusted to perform a delayed reproduction of the magnetic recorded sound equal to the time required for a film to travel from the lens gate of a single system motion picture camera or sound projector to its sound recording device whereby each picture image or frame may be made to register with its corresponding portion of the sound track to thereby leave sufficient room or margin for splicing without affecting critical or valuable sound or notes.

References Cited in the file of this patent

UNITED STATES PATENTS

| | | |
|---|---|---|
| 1,466,750 | Peterson | Sept. 4, 1923 |
| 1,965,173 | Canton | July 3, 1934 |

FOREIGN PATENTS

| | | |
|---|---|---|
| 535,503 | Germany | Oct. 12, 1931 |